Aug. 16, 1966  E. J. PETANOVICH  3,266,640
RUNOUT TABLE
Filed Sept. 23, 1964  2 Sheets-Sheet 1
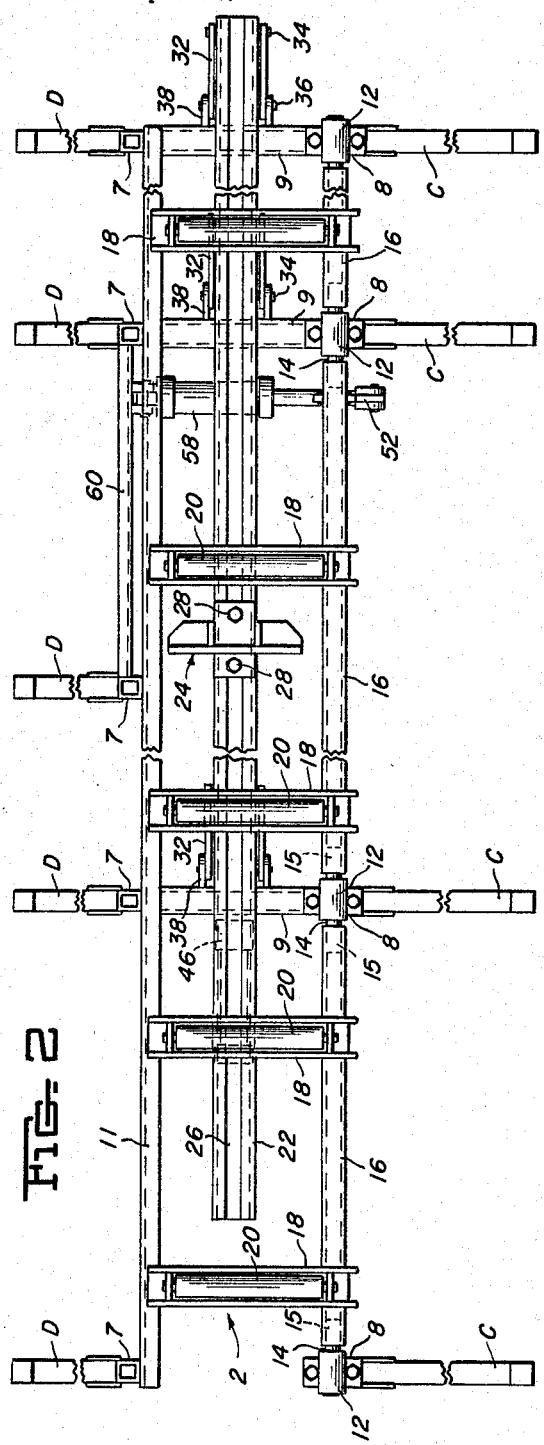
INVENTOR
EDWARD J. PETANOVICH
Donald G. Dalton
Attorney Aug. 16, 1966  E. J. PETANOVICH  3,266,640
RUNOUT TABLE
Filed Sept. 23, 1964  2 Sheets-Sheet 2
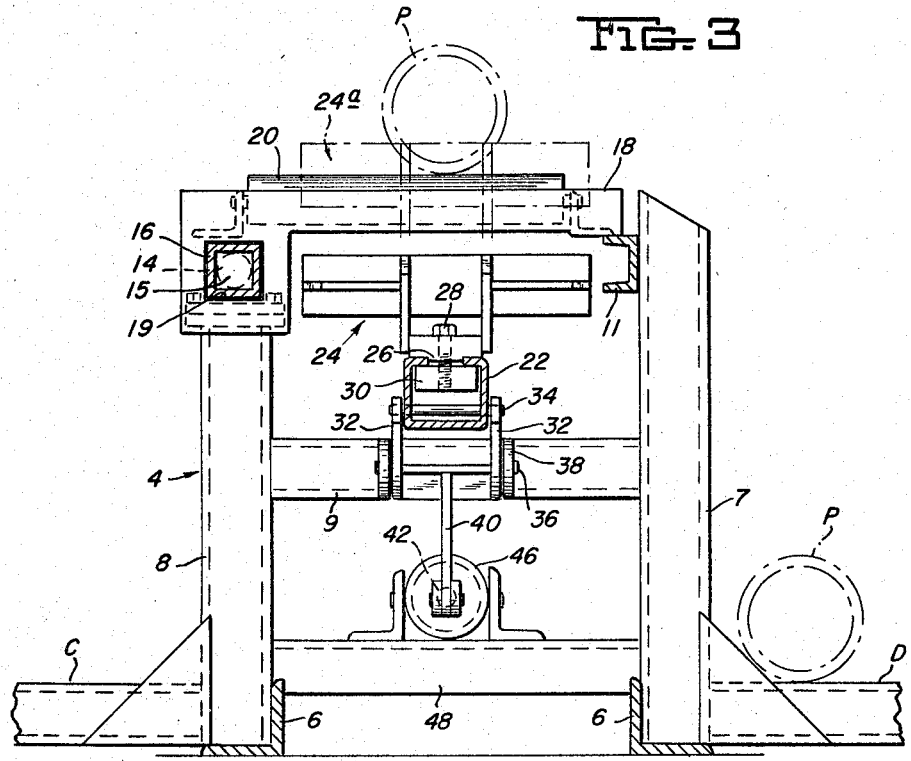
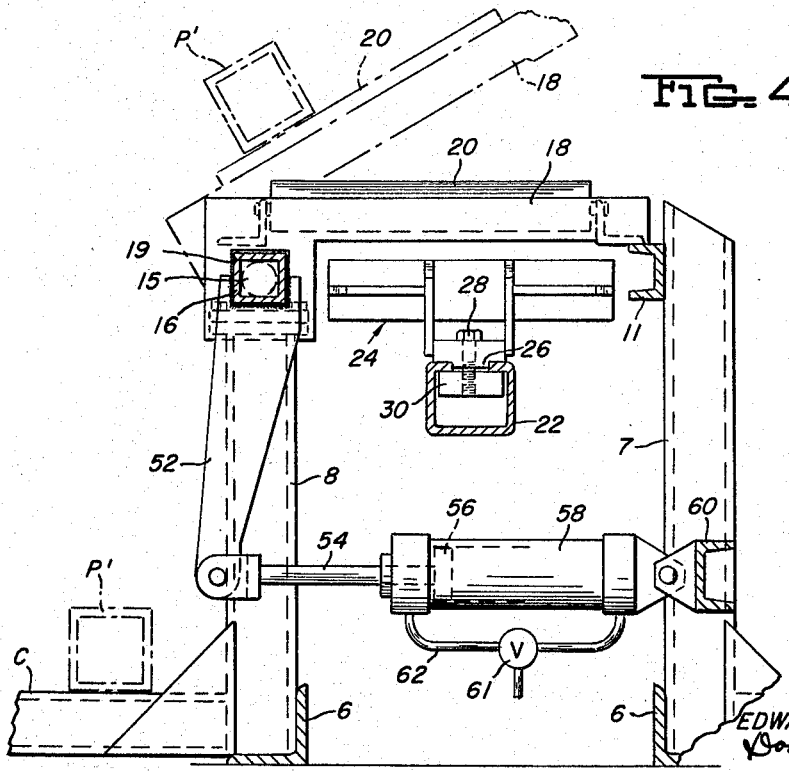
INVENTOR
EDWARD J. PETANOVICH
Donald G. Dalton
Attorney

United States Patent Office 3,266,640
Patented August 16, 1966

3,266,640
RUNOUT TABLE
Edward J. Petanovich, Franklin Township,
Beaver County, Pa.
Filed Sept. 23, 1964, Ser. No. 398,645
5 Claims. (Cl. 214—1.1)

This invention relates to a runout table for supporting and measuring lengths of tubes, beams, strip and bar stock, and other like products, in preparation for their being cut to their desired lengths on a saw. The runout table has idler rollers for supporting the product lengths and is placed on one side of the saw, while a feeder table with driven rollers is located on the other side of the saw.

In the past, desired product lengths have been measured on the runout tables by an operator taking measurements with a tap measure or by means of measurements marked along the bed of the runout table. Taking measurements in this way has required the operator to walk the length of the product he was measuring. Another way of measuring the product lengths has been by means of a gage block suspended from a beam above the runout table. The block is adjustable along the length of the beam and when in use, it is set a proper distance from the saw so as to stop the product when the desired length has been run past the saw. The beam is supported by vertical columns placed along the side of the runout table, and horizontal cross members extending from these columns over the runout table to the beam. Since the beam must be long enough so that the gage block can be set to measure both the longest and shortest product lengths to be cut and must be strong enough to be supported with a minimum of deflection, the weight of the beam is considerable and the columns and other supporting members must be made strong enough to support it. Thus, a rather elaborate and expensive structure is needed to measure product lengths by means of a gage block suspended from an overhead beam.

The runout table which I have invented is of a relatively simple design compared to the type equipped with a gage block suspended from an overhead beam, and costs considerably less to build. Also, the desired product lengths are still measured automatically without need for the operator at the saw to walk the length of the runout table to obtain measurements. The measuring is accomplished by a gage block supported from underneath the table rollers which support the products to be cut. Thus, no supporting columns are needed along the side of the table and there need be no space provided along the side of the table for an operator to take measurements. Cradle bucks may therefore be provided on both sides of the table for accepting products after they have been cut to size and discharged from the runout table.

It is an object of my invention to provide a runout table having the advantages mentioned above.

Other objects will appear more readily from the following detailed description and attached drawings in which:

FIGURE 1 is a side elevation of a runout table and a saw for cutting products to their proper lengths;
FIGURE 2 is a top plan view of the runout table of FIGURE 1;
FIGURE 3 is a sectional view taken through lines III—III of FIGURE 1; and
FIGURE 4 is a sectional view taken through lines IV—IV of FIGURE 1.

In FIGURE 1, a runout table 2 is placed next to a saw S, located at the far left-hand side of the figure. The saw S is provided with a clamp X for holding products while they are being sawed. Cradle bucks C and D, shown in FIGURE 2 on the near and far sides of the table 2 respectively, are for receiving the product lengths after they are cut on the saw S and rolled off of table 2.

The runout table 2 is made of a table frame 4 that includes base angle members 6 extending along the length of the frame 4 and vertical support members 7 and 8 welded to the angle members 6 and spaced at intervals along the sides of frame 4. Cross bars 9 are welded between each support member 8 and an opposed member 7 on the other side of frame 4. Brace members, such as members 10 shown on the left side of frame 4 in FIGURE 1, may be welded between the support members 8 to add more rigidity to the frame. A horizontal channel member 11 (FIGURE 2) is welded to the inner sides of support members 7 near their top ends and extends along the length of frame 4.

Mounted on the tops of support members 8 on the near side of frame 4 are bearing housings 12, in which short round shafts 14 are journaled. The shafts 14 have square end portions 15, best seen in FIGURE 3. End portions 15 are inserted within and welded to square tube members 16. All of the shafts 14 and square tube members 16 along the length of frame 4 rotate together and constitute one long continuous shaft.

Roller supports 18 are slidably mounted on square tube members 16. As shown in FIGURE 3, these roller supports have square holes 19 through which the square tube members 16 fit. The roller supports 18 are thus keyed to the tube members 16 so that they rotate with them, but the roller supports are free to slide lengthwise along the tube members. On the far side of frame 4, the roller supports 18 rest upon the channel member 11. The supports 18 hold rollers 20 rotatably about horizontal axes that are perpendicular to the tube members 16. The rollers 20 support products, such as product P (FIGURE 1), that are roller out onto runout table 2 to be measured and cut to size. Two or three rollers 20 and supports 18 are provided in each interval between adjacent vertical support members 8.

A long horizontal beam 22, made of square tubing, extends along the length of frame 4 underneath the rollers 20. A gage block 24 is mounted on the top of beam 22, and the block is adjustable by sliding it along a slot 26 provided in the top of beam 22. As shown in FIGURE 3, bolts 28 extend through holes in the gage block 24 and into slot 26. The bolts are threaded into a gage locking plate 30 that is located below the slot 26 and within the hollow square-section beam 22. When the gage block 24 is set in its desired position on beam 22, the bolts 28 are tightened to secure the block in this position.

When the gage block 24 is in its solid-line position shown in FIGURE 1, it is completely below the rollers 20, and is therefore inoperative to stop any products pushed onto the runout table 2. The block may be raised to its operative position 24a, illustrated by dotted lines in FIGURE 1, by lifting the supporting beam 22.

Beam 22 is made vertically adjustable by connecting it to cross bars 9 of frame 4 with lever arms 32. The lever arms 32 are pivotally connected to the beam 22 by pins 34, and to the cross bars 9 by pins 36, which extend between arms 38 on the cross bars 9. On the rearmost lever arm 32, toward the left side of the runout table as viewed in FIGURE 1, is attached an arm 40 integral with and rotating with the lever arm 32. Arm 40 is pivotally connected to a rod 42, and rod 42 is attached to a piston 44 riding within an air cylinder 46. The air cylinder 46 is pivotally mounted on a support 48 that is welded to vertical support members 7 and 8 of the frame 4. Air supply hoses 50 lead to an appropriate valve 51 for controlling the air pressure within the cylinder 46 to cause the piston 44 to travel back and forth within the cylinder. When the piston 44 is moved forward in cylinder 46, it causes the arm 40 and lever arms 32 to be rotated counterclockwise, thereby lifting the connected beam 22 upward until the gage block 24 has been raised partially above the rollers 20 to its operative dotted line position 24a, shown in FIGURE 1.

The table 2 is provided with means for dumping the products after they have been cut into cradle bucks C at the near side of table 2, as viewed in FIGURE 2. The ends of the roller support members 18 which rest on channel member 11 are raised upward by rotating the square tube members 16 on which the support members 18 are held. For this purpose, a lever arm 52 (FIGURE 4) is attached to one of the tube members 16 and is pivotally connected at its bottom end to a rod 54. A piston 56 is mounted on rod 54 and slides within an air cylinder 58. The air cylinder 58 is pivotally connected at its rear end to a frame member 60 that is welded to two of the vertical support members 7. The pressure in air cylinder 58 is controlled by a valve 61 in air supply lines 62. Changing this pressure causes the movement of piston 56, which turns the lever arm 52 and rotates the connected tube members 16 and roller supports 18.

In the operation of runout table 2, the operator first moves the gage block 24 to its approximate desired position on beam 22. While the gage block 24 is being moved, the beam 22 is kept in its lowest position so that the gage block will slide under rollers 20 and roller supports 18, as shown in FIGURE 3. The beam 22 may be provided with markings to enable the operator to set the gage block 24 in the exact position desired, so that when the block is raised to the dotted line position 24a of FIGURE 1, the distance of the block 24 from the saw S will conform to the required length of the product to be cut. The final setting of block 24 may also be made after the block has been raised to its operative position 24a, by means of markings on channel member 11, or by a tape measure extended between the saw S and the gage block 24. In all cases, bolts 28 are tightened to secure the block 24 to beam 22 so that it will not slide along slot 26.

The operator raises the block 24 to its operative position 24a by adjusting the air pressure in cylinder 46 to cause the piston 44 to move forward and rotate the arms 32 and 40, thereby raising the beam 22 and supported block 24. If there are any roller supports 18 in the way when it is desired to move the gage block 24 up to its operative position, these supports may be easily moved since they are freely slidable along the square tube members 16.

When the gage block 24 is set in its operative position a proper distance from saw S, the operator rolls a product to be cut, as product P in FIGURES 1 and 3, onto the runout table 2. This is done by power-driven feeder rolls on a feeding table (not shown) on the opposite side of the saw S from runout table 2. The product is rolled onto the table 2 until it hits the gage block 24. The operator then retracks the gage block 24 below the rollers 20 by adjusting the air pressure in cylinder 46. The product is clamped in clamp X and sawed by saw S. The operator then unclamps the product and rolls by hand the cut product length forward on runout table 2, away from the saw S. If the product is of a round cross section, as is product P in FIGURE 3, it may be rolled sideways by hand off the rollers 20 and into cradle bucks D on the right side of runout table 2, as viewed in FIGURE 3. If the product is of a square or rectangular cross section, as is the product P′ in FIGURE 4, the ends of roller support members 18 which rest on channel member 11 are rotated upward by adjusting the pressure in air cylinder 58, thereby dumping the cut product length into cradle bucks C on the left side of table 2 as viewed in FIGURE 4. After the cut product has been dumped into either cradle bucks C or D, the gage block 24 is again raised to its operative position 24a, so that the runout table will be ready to receive the next product length to be cut.

While one embodiment of my invention has been shown and described it will be apparent that other adaptations and modifications may be made without departing from the scope of the following claims.

I claim:

1. A runout table for supporting and measuring products to be cut to desired lengths comprising a table frame, rollers mounted on said frame for supporting said products, a beam mounted on said frame parallel to said products and disposed on the opposite side of said rollers from said products, a gage block mounted on the side of said beam facing said rollers and slidable along the length thereof, said beam and block movable toward and away from an operative position wherein said block is held in line with said products supported on the rollers, means for moving said beam and block toward and away from said operative position, and means to secure said block in a fixed position along the length of said beam so that when moved to said operative position said block is effective to stop the travel of one of said products when a desired length thereof has been run out onto said table.

2. The runout table of claim 1 wherein said means for moving said beam includes an arm pivotally connected to said beam at one end and pivotally connected to said frame at its other end, and means for rotating said arm about said pivotal connection to said frame.

3. The runout table of claim 2 wherein said means for rotating said arm includes an air cylinder mounted on said frame, a link fixed to said arm and rotatable about said pivotal connection to the arm to said frame, a piston within said cylinder connected to said link, and means to change the air pressure in said cylinder to move said piston back and forth therein and thereby rotate said connected link and arm and move said beam.

4. The runout table of claim 1 including roller support members for holding said rollers rotatable about axes perpendicular to said products, said roller support members being mounted on a second beam parallel to said products and slidable along the length thereof so that said rollers may be moved out of the way of the travel of said block to and from said operative position.

5. The runout table of claim 4 with said second beam rotatable about a lengthwise axis, said roller support members keyed to said beam so as to rotate with the beam, a lever arm mounted on said beam and means to rotate said arm and beam about said lengthwise axis.

References Cited by the Examiner

UNITED STATES PATENTS 2,561,012 7/1951 Clark _____ 83—126
3,141,367 7/1964 Keener.

MARVIN A. CHAMPION, *Primary Examiner*.